United States Patent [19]
Gottschald

[11] Patent Number: 5,454,194
[45] Date of Patent: Oct. 3, 1995

[54] SYSTEM FOR GRINDING THE OPTICAL SURFACES AND/OR THE EDGES OF EYEGLASS LENSES

[75] Inventor: Lutz Gottschald, Meerbusch, Germany

[73] Assignee: Wernicke & Co. GmbH, Düsseldorf, Germany

[21] Appl. No.: 245,817

[22] Filed: May 18, 1994

Related U.S. Application Data

[63] Continuation of Ser. No. 923,581, Aug. 3, 1992, abandoned.

[30] Foreign Application Priority Data

Aug. 16, 1991 [DE] Germany ............ 41 27 094.0

[51] Int. Cl.⁶ ............... B24B 49/00; B24B 49/12
[52] U.S. Cl. .................. 451/11; 451/10; 451/5
[58] Field of Search ............ 51/284 R, 284 E, 51/165.71, 165.72, 165.74, 165.75, 165.76, 101 LG, 105 LG, 106 LG, 215 R, 326, 3, 5 R, 165.77; 29/564, 564.7, 791; 901/47

[56] References Cited

U.S. PATENT DOCUMENTS

| | | | |
|---|---|---|---|
| 3,807,098 | 4/1984 | Schaller et al. | 51/165.71 |
| 4,543,702 | 10/1985 | Wada | 29/791 |
| 4,656,590 | 4/1987 | Ace | 51/165.72 |
| 4,723,376 | 2/1988 | Blum et al. | 51/165.72 |
| 4,737,918 | 4/1988 | Langlois et al. | 51/165.71 |
| 4,760,671 | 2/1988 | Ward. | |
| 4,945,684 | 8/1990 | Wada | 51/165.71 |
| 4,979,135 | 12/1990 | Moy | 901/47 |
| 5,053,971 | 10/1991 | Wood et al. | 51/165.71 |
| 5,080,482 | 1/1992 | Benz et al. | 51/101 LG |
| 5,139,373 | 8/1992 | Logan et al. | 51/101 LG |
| 5,144,561 | 9/1992 | Soper | 51/165.71 |
| 5,148,637 | 9/1992 | Byron | 51/165.71 |
| 5,210,695 | 5/1993 | Wood | 51/165.71 |

FOREIGN PATENT DOCUMENTS

| | | | |
|---|---|---|---|
| 0061918 | 10/1982 | European Pat. Off. | |
| 0128779 | 9/1984 | European Pat. Off. | |
| 0363281 | 4/1990 | European Pat. Off. | |
| 2327030 | 6/1977 | France. | |
| 2483631 | 4/1981 | France. | |
| 1238802 | 4/1967 | Germany. | |
| 2258398 | 7/1977 | Germany. | |
| 3316619 | 6/1987 | Germany. | |
| 238264 | 11/1985 | Japan | 51/5 R |
| 1011759 | 1/1989 | Japan. | |
| 2241911 | 9/1991 | United Kingdom | 51/165.72 |

Primary Examiner—Jack W. Lavinder
Attorney, Agent, or Firm—Klein & Vibber

[57] ABSTRACT

System for grinding eyeglass lenses with at least one grinding disk, a rotatable holder for an eyeglass lens blank, a device to control the grinding process in accordance with pre-determined optical values and/or a predeterminable outline of a glass lens, a CNC controlled manipulator to insert an eyeglass lens blank in the holder in an exact position, and an input device for the decentration values for the predetermined outline in reference to the optical center of the eyeglass lens. The utilization of the manipulator eliminates the difficult and time-consuming centering of the eyeglass lens blank by hand so that a plurality of eyeglass lens grinding machines can be loaded by a single manipulator.

2 Claims, 1 Drawing Sheet

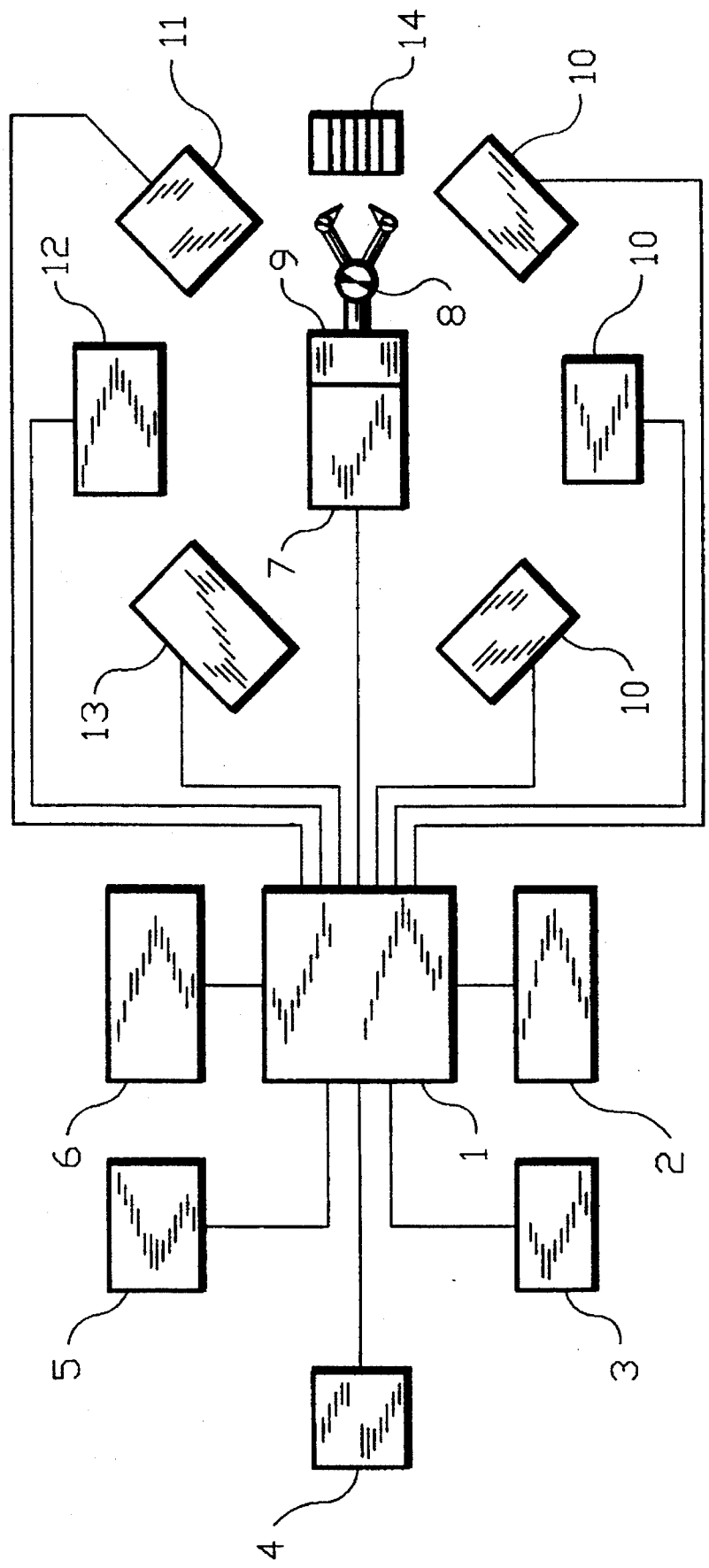

SYSTEM FOR GRINDING THE OPTICAL SURFACES AND/OR THE EDGES OF EYEGLASS LENSES

This is a continuation application of application Ser. No. 07/923,581, filed Aug. 3, 1992, now abandoned.

BACKGROUND OF THE INVENTION

The invention relates to a system for grinding the optical surfaces and/or the edges of eyeglass lenses using a grinding disk, a rotatable holder for an eyeglass lens blank and a device for controlling the grinding processes in accordance with a preselected outline for the eyeglass lens.

Eyeglass lens edge grinding machines are known in the art and can in their simplest embodiment include a device to control the grinding process in accordance with a preselected outline for the eyeglass lens in the form of a template mounted on a rotatable holder. This template generally corresponds to the shape of the lens opening in the frame into which the ground eyeglass lens is to be inserted.

CNC controlled eyeglass edge grinding machines are also already known in the art and are disclosed, for example, in German published, unexamined patent specification 33 16 619 or European published, unexamined patent specification 0 363 281. CNC controlled eyeglass lens grinding machines which process the optical surfaces as well are disclosed in European patent specification 0 061 918 and in German patent specification 38 17 850. In the case of the CNC controlled eyeglass lens edger machines the outline of the eyeglass lens is provided in the form of data record which is used to control the grinding process in such a way that the prescribed outline of the eyeglass lens will be achieved.

Common to both the purely mechanical and the CNC controlled eyeglass lens grinding machines is that the eyeglass lens blank is inserted in the holder by hand, which is time-consuming and which requires a certain degree of skill.

Before the eyeglass lens blank can be inserted in the rotatable holder of a conventional eyeglass lens grinding machine, the eyeglass lens blank must be fitted in advance with a sucker or block which must be positioned in accordance with the decentration values for the prescribed outline, determined by the optician, referenced to the optical center of the eyeglass lens. The block or sucker serves to hold the eyeglass lens blank exactly in position in the rotatable holder and which makes with the rotatable holder a connection resistant to rotation.

If the eyeglass blanks are to be subjected to cylindrical or prismatic grind, the angle of the axis of the cylinder (cylinder angle) must also be observed when positioning the sucker or block and when inserting the configuration in the rotatable holder in the eyeglass lens edge grinding machine.

A further difficulty is encountered where eyeglass lens blanks are manufactured as multi-focal lenses since then the location of the presbyopia correction segment with reference to the optical center of the distant vision segment will have to be observed.

To apply a sucker or block, a device is used with which the eyeglass lens blank is initially positioned in accordance with the optical value, the decentration values and/or the cylinder angle, after which the sucker or block is attached to the prepositioned eyeglass lens blank.

It is obvious that this method of operation is time-consuming and requires great professional skill so that this activity can be carried out only by trained opticians. Due to the time consuming positioning; and blocking of each eyeglass lens blank, however, the degree of utilization for the eyeglass grinding machine, particularly when it is CNC controlled, is low.

A loading device at the lens edge grinding machine disclosed in German patent 1 238 802 cannot substitute for the skill of the optician since this machine is suitable only for loading when the interpupillary distance is exactly aligned with the optical center.

SUMMARY OF THE INVENTION

The object of the invention is to simplify and accelerate the production of an eyeglass lens in accordance with a preselected outline, taking into consideration the optical data for the eyeglass lens and the decentration value for the eyeglass in the selected eyeglass frame, while at the same time improving manufacturing precision.

Based on this object, it is proposed to use a system to grind the edge of eyeglass lenses in the fashion mentioned at the outset, wherein by way of invention a CNC controlled manipulator is used to exactly position and insert an eyeglass lens blank in the holder of an eyeglass lens grinding machine and a control device with an input device for the decentration values for the prescribed outline with reference to the optical center of the eyeglass lens is used to control the manipulator. The manipulator grasps the edge of the eyeglass lens blank and inserts the eyeglass lens blank in the opened holder of the eyeglass grinding machine. Here the manipulator is controlled in such a way that the eyeglass lens blank is positioned in relationship to the rotation axis of the holder in accordance with the specified decentration values. When the holder then clamps the eyeglass lens blank and the manipulator releases the eyeglass lens blank, the grinding process can be performed in accordance with prescribed optical values and/or in accordance with a preselected outline for the eyeglass lens, taking the decentration values into account. Blocking the eyeglass lens blank prior to its insertion into the holder in the eyeglass lens edger machine can be eliminated if the holder is designed so that it can clamp the eyeglass lens blank in such a way as to prevent any rotation once it has been exactly positioned by the manipulator.

In addition to the decentration values, the input device can also be used to enter the cylinder angle in relation to the preselected outline when machining eyeglass lenses with a cylindrical or prismatic grind and/or the optical values of the eyeglass lens to be ground, namely in multi-focal lenses the location of the presbyopia correction segments.

The optical values and the cylinder angle are determined by the ophthalmologist or optician for the person requiring the corrective lenses. The decentration values result from the interpupillary distance of this person in relationship to the selected frame.

In order to now be able to automatically align the appropriate eyeglass lens blank a focimeter mounted in the working range of the manipulator can be used, featuring a sensor and a data link to the control equipment, to position the eyeglass lens blank held by the manipulator at the optical center and to register the data for the optical center for the subsequent, exactly positioned insertion of the eyeglass lens blank in the holder.

Another option for controlling the manipulator may be given by machine-readable encoding of the optical values on the eyeglass lens blank. The eyeglass lens blank grasped by the manipulator can then be moved into the working range of a device, which reads the encoded optical values data link to the control unit, so as to make it possible to insert the eyeglass lens blank in the holder in the exact position, in accordance with the optical values registered by the sensor and the decentration values and/or the cylinder angle entered by the operator.

A large number of differing eyeglass lens blanks can be located in a storage container which is accessible to the manipulator, whereby for each eyeglass lens blank a machine-readable encoding mark can be located on the storage container as its address, this being read by a sensor in the manipulator and used to control via a data link to the control unit the removal of an eyeglass lens blank from the storage container according to optical values which had been entered.

The storage container can be designed in such a way that the eyeglass lens blanks are already oriented in the correct position as regards their optical values and can be removed in this attitude so that no additional control command need be given for the optical values, in particular for the position of the presbyopia correction sections in the eyeglass lens blank, whereby the manipulator need only take care of the positioning in accordance with the decentration values and the cylinder angle.

It is however also possible to place the eyeglass lens blanks in the storage container in any arbitrary position and to perform the positioning in the manner described above with the assistance of machine-readable encoding marks on the eyeglass lens blank or using a focimeter.

In order to achieve an exactly positioned coupling which is resistant to relative rotation visa vis the rotatable holder in the eyeglass lens grinding machine, and particularly in conventional eyeglass lens edging machines, devices for attaching a sucker or block to the eyeglass lens blank are used as a rule. These devices, when utilized in the normal fashion, are equipped with optical and/or opto-electronic devices by means of which the eyeglass lens blanks are aligned in accordance with the optical values, the decentration values and/or the cylinder angle.

If the manipulator proposed here by way of invention is used in conjunction with a conventional eyeglass lens edger unit, the manipulator can be used to position an eyeglass lens blank exactly and in dependency on the optical values, the decentration values and/or the cylinder angle in a very simple device for the attachment of a sucker or block and to attach the sucker or block to the eyeglass lens blank. Subsequently, it is possible to mount the eyeglass lens blank with the sucker or block attached to it in the holder of a conventional eyeglass lens edger unit and to in turn fix it exactly in position.

It is of advantage that the control unit comprise an electronic computer with data memory and data links both to the manipulator and to an eyeglass lens edger unit so that the control unit can be used to control both the manipulator and the eyeglass lens edger unit. To this purpose the control unit may include an input device for the decentration values and/or the cylinder angle and the optical values for the eyeglass lens blank to be ground as well as for the outline of the eyeglass lens, this information being used to control insertion of the eyeglass lens blank in the exact position in the holder and to control the grinding of the eyeglass lens. The outline of the eyeglass lens can be entered in the control unit in a variety of ways, known in the art, for example by tracing the selected eyeglass frame and forwarding the values to the computer or data storage, by transferring the data for a particular eyeglass frame which are stored on a diskette or by placing a large number of eyeglass frame data records in storage and calling the data for a particular eyeglass frame by entering a code number or by reading this code number from a bar code.

With a control unit of this type, comprising an electronic computer with data storage and with a manipulator controlled by the same, a large number of eyeglass lens grinding machines located within the reach of the manipulator can be located with eyeglass lens blanks which are then machined in accordance with the data available at the control unit. In this way it is possible to set up machining centers for machining the eyeglass lenses, comprising grinding machines for the optical surfaces and eyeglass lens edges unit and which are of particular advantage where eyeglasses are to be fitted and sold in department stores in chain stores.

BRIEF DESCRIPTION OF THE DRAWING

The invention is described in detail below with the help of an embodiment depicted in the single figure of the drawing which depicts a schematic flow diagram in conjunction with several eyeglass lens edger units.

DESCRIPTION OF THE PREFERRED EMBODIMENTS

The machining center is illustrated schematically as a block diagram and comprises a control unit 1 in the form of an electronic computer with data storage, such as a personal computer for example. The control unit exhibits an input device 2 in the form of an alphanumeric keyboard at which the decentration values, the cylinder angle and/or the optical values of the eyeglass lens to be manufactured are entered. Additional input devices for the control unit 1 may comprise a bar code reader 3, a diskette drive 4 and/or an eyeglass frame tracing device 5. The bar code reader 3 may read the code number of a given eyeglass frame or the optical values from an appropriately encoded eyeglass lens blank. In this case all the digitalized data for an eyeglass frame and the outline for the eyeglass lens which results therefrom are already present in the storage device at the control unit 1 and are called up by entering the code number of the data for an eyeglass frame are not already stored in the control unit 1, these data can be read from a diskette inserted in the diskette drive 4 and thus transferred to the control unit 1.

Finally, the data values for the outline of the eyeglass lens to be manufactured can be obtained from an eyeglass frame which is physically present by drawing the contours of this eyeglass frame in an eyeglass frame tracing unit 5.

A video display unit 6 serves to show the values entered so that they can be verified and can also be used to display the given outline of the eyeglass lens and to examine the decentration values in reference to the size of the eyeglass lens blank.

Joined to the control unit 1 by means of a data cable is a manipulator 7 featuring an arm 8 used to grasp the eyeglass lens blank. The manipulator 7 also features a sensor 9, shown schematically. The manipulator 7 inserts an eyeglass lens blank held by the arm 8 into an opened holder, not shown, in an eyeglass lens edger unit 10. A CNC controlled eyeglass lens edger unit of this type is manufactured and distributed by the applicant, for example under the model designation CNC 90. Details of this eyeglass lens edger unit consequently need not be described.

In the example shown three eyeglass lens edger units 10 are located within the working range of the manipulator 7.

Also located within the working range of the manipulator 7 are a sensor 11, a focimeter 12, a blocking unit 13 and a storage container 14 in the form of a magazine for eyeglass lens blanks.

There are stored in the magazine 14 is a larger number of differing eyeglass lens blanks which are provided with an address on the magazine by means of machine-readable coding. The input device 2 is used to enter the decentration values, the optical values and, if appropriate, the cylinder angle, whereby the manipulator 7 used the address indicated on the magazine 14 to search for and grasp the appropriate eyeglass lens blank.

If the eyeglass lens blanks in the magazine 14 are arranged in a particular attitude in consideration of their optical values, namely considering the position of the presbyopia section in reference to the optical center, the manipulator 7 will take the eyeglass lens blank, once grasped, directly to the blocking unit 13, align the eyeglass lens blank in accordance with the decentration values and the cylinder angle and the sucker or block will be set on the eyeglass lens blank under the control of the control unit 1. A device of this type for the attachment of a sucker or block is disclosed in the applicant's German utility model specification G 87 02 562.0.

Leaving the device 13 the manipulator 7 then turns to one of the eyeglass lens edger units 10 and seats the eyeglass lens blank in the holder unit. The holder unit locks exactly in position in the sucker or the block attached to the eyeglass lens blank, the arm 8 releases its grasp on the eyeglass lens blank and the manipulator 7 leaves the vicinity of the eyeglass lens edger unit 10, which will then under control of control unit 1 edge the eyeglass lens blank in accordance with the preselected outline of the eyeglass lens.

In the meantime the manipulator 7 can approach the magazine 14 again, remove a further eyeglass lens blank and manipulate it in the manner described to load the second eyeglass lens edger unit 10.

If the eyeglass lens blanks in the magazine 14 are not positioned in a specified attitude, a sensor 11 can be used to determine the position of a presbyopia section present in the eyeglass lens blank, in reference to the optical center of the distant vision section, if appropriate information is provided on the eyeglass lens blank in the form of machine-readable marking, such as a bar code. The sensor 11 acquires this information and forwards it to the control unit 1 and this control unit 1 causes the manipulator 7 to position the eyeglass lens blank appropriately in the device 13. Then the eyeglass lens blank is inserted in one of the eyeglass lens edger units 10 in the prescribed fashion.

If there is no machine-readable coding on the eyeglass lens blank, the manipulator 7 moves the eyeglass lens blank to a focimeter 12 which measures the eyeglass lens blank and forwards the data thus determined to the control unit 1. The control unit 1 converts these data into commands for the manipulator which then positions the eyeglass lens blank in the appropriate attitude in accordance with this data, inserts it in the device 13 and after attaching a sucker or block moves it to one of the eyeglass lens edger units 10.

As was already mentioned, the eyeglass lens edger unit 10 is preferably a model CNC 90 CNC-controlled eyeglass lens edger unit manufactured by the assignee of the applicant. These eyeglass lens edger units are driven by the control unit 1 and perform the grinding, of the eyeglass lens blank automatically until the prescribed outline of the eyeglass lens is created. The manipulator 7 can however also be used in conjunction with simple eyeglass lens edger units which are not CNC controlled and which are manufactured and distributed by the applicant under model designation C 90. In this case the grinding of the prescribed outline of the eyeglass lens is performed on the basis of a template exhibiting this outline and which is mounted on the rotatable holder for the eyeglass lens blank. The control unit 1 then transmits only a control command for closing the holder for the eyeglass lens blank once the manipulator 7 has positioned the eyeglass lens blank in the exact position, between the opened holder, and gives the start command for the grinding procedure. The grinding process itself is also carried out fully automatically but is controlled by the template in regard to the shape of the eyeglass lens.

After the completion of the grinding process the completed eyeglass lens can be removed from the eyeglass lens edger unit 10 either by hand or by the manipulator 7 and mounted in the appropriate eyeglass frame.

In the embodiment described here a sucker or block is attached to the eyeglass lens blank in the blocking unit. It may, however, be possible to forego this if the holder is designed in such a way that it can clamp the eyeglass lens blank positioned exactly by the manipulator without any rotation and without any further auxiliary aids during the subsequent grinding process.

The eyeglass lens edger units 10 described here can be substituted for in part by grinding machines for the optical surfaces of eyeglass lenses or may comprise machines with which both the optical surfaces and the edge can be machined.

While the invention has been described in detail by specific reference to preferred embodiments thereof, it is understood that variations and modifications may be amde without departing from the tru spirit and scope fo the invention.

What is claimed is:

1. System for grinding the optical surfaces and edges of eyeglass lens blanks in accordance with preselected data for producing a finished eyeglass having a preselected optical surface, edge and optical axis, comprising in combination, at least one grinding wheel operatively mounted in a lens grinding machine;

at least one holder for holding eyeglass lens blanks rotatably mounted in said lens grinding machine;

at least one control unit operatively connected to said grinding machine for controlling the grinding in accordance with preselected optical values and/or a preselected outline for the eyeglass lens, each eyeglass lens also having a decentration value and a cylinder angle for a prescribed outline of the eyeglass lens, at least one input device connected to said control unit for entering into the control unit the optical values of the eyeglass lens and/or for the decentration values in respect to the prescribed outline with reference to the optical axis of an eyeglass lens blank which is to be ground; and at least one CNC controlled manipulator having an operating range for receiving and precisely positioning the eyeglass lens blank in the holder of the lens grinding machine in accordance with the optical values of the to be ground eyeglass lens, which optical values have been entered by the input device in to the control unit, including machine readable encoding to individually identify each of a number of different eyeglass lens blanks stored in a storage container (14) located within the operating range of the manipulator (7), and a sensor (9) for on the manipulator (7), a data link to the control unit to control the removal of an eyeglass lens blank from the storage container (14) in accordance with the optical values entered into said control unit.

2. System for grinding the optical surfaces and edges of eyeglass lens blanks in accordance with preselected data for producing a finished eyeglass having a preselected optical surface, edge and optical axis, comprising in combination, at least one grinding wheel operatively mounted in a lens grinding machine;

at least one holder for holding eyeglass lens blanks rotatably mounted in said lens grinding machine;

at least one control unit operatively connected to said grinding machine for controlling the grinding in accordance with preselected optical values and/or a preselected outline for the eyeglass lens, each eyeglass lens also having a decentration value and a cylinder angle for a prescribed outline of the eyeglass lens, at least one input device connected to said control unit for entering into the control unit the optical values of the eyeglass lens and/or for the decentration values in respect to the prescribed outline with reference to the optical axis of an eyeglass lens blank which is to be ground; and at least one CNC controlled manipulator having an operating range for receiving and precisely positioning the eyeglass lens blank in the holder of the lens grinding machine in accordance with the optical values of the to be ground eyeglass lens, which optical values have been entered by the input device in to the control unit, and including a machine readable encoding of the optical values on each eyeglass lens blank, and a sensor for scanning the machine readable encoding of the optical values, a data link to the control unit to control the exact positioning and insertion of the eyeglass lens blank in the holder, in dependency of the optical values and the decentration values entered and/or the cylinder angle.

* * * * *